United States Patent [19]

Lewis et al.

[11] Patent Number: 5,441,556
[45] Date of Patent: Aug. 15, 1995

[54] METAL PROCESSING OR RECOVERY AND APPARATUS

[75] Inventors: Keith C. Lewis, Telford; Ophneil H. Perry, Kingswinford, both of United Kingdom

[73] Assignee: Stein Atkinson Stordy Ltd., West Midlands, United Kingdom

[21] Appl. No.: 204,373
[22] PCT Filed: Sep. 2, 1992
[86] PCT No.: PCT/GB92/01604
 § 371 Date: Jun. 24, 1994
 § 102(e) Date: Jun. 24, 1994
[87] PCT Pub. No.: WO93/06253
 PCT Pub. Date: Apr. 1, 1993

[30] Foreign Application Priority Data
 Sep. 13, 1991 [GB] United Kingdom ............... 9119543

[51] Int. Cl.[6] ............................................. C22B 7/00
[52] U.S. Cl. .......................................... 75/414; 75/687; 266/156; 266/205; 266/901
[58] Field of Search ................. 75/686, 687, 414, 585, 75/571; 266/156, 200, 205, 207, 900, 901

[56] References Cited

U.S. PATENT DOCUMENTS 2,446,637 8/1948 Crampton et al. .................. 266/200

*Primary Examiner*—Melvyn Andrews
*Attorney, Agent, or Firm*—Learman & McCulloch

[57] ABSTRACT

Continuous melting of lightweight shredded metal, e.g., in the recycling of aluminum can scrap is achieved by feeding lightweight scrap portions into a melting chamber through which a heated gas stream flows upwardly at a temperature in excess of the metal melting point and at such velocity that the scrap portions are borne in the flow within the chamber until they melt into denser droplets or globules which drop from the chamber and are collected in a holding furnace.

15 Claims, 2 Drawing Sheets

METAL PROCESSING OR RECOVERY AND APPARATUS

This invention relates to the processing or recovery of metallic or metal-containing material by melting or smelting. While the invention is particularly applicable to the recovery of metal scrap, notably aluminium can scrap, other applications in the metallurgical field are contemplated, for example the smelting of metalliferous ores, metal refining or purification, compounding metal alloys, or remelting metal for further processing such as casting.

BACKGROUND OF THE INVENTION

Many of the long established methods and apparatus for melting or smelting said materials require substantial installations which are costly to build, maintain and run; have low thermal efficiency may cause unacceptable atmospheric pollution and, in some cases, are only suited to the handling of higher melting point metals such as iron and steel.

More recently apparatus such as electric induction melting furnaces and vortex melting devices have been developed for lighter and lower melting point metals such as aluminium scrap but again such installations will only operate effectively on a large scale involving substantial capital cost, high energy input, and inability to process small batches of material.

In the case of aluminium can scrap the empty cans are normally first passed through a delacquering process and shredded, and these shreds are then fed into an induction or vortex melter which has to hold a substantial volume of already molten metal because the incoming scrap is only heated to melting point by heat directly conducted to it from the molten bath. If too great a quantity of unmelted material enters the bath it may cool the latter so that it solidifies, thus a large volume of molted metal has to be kept heated. Moreover the shredded scrap tends to float on the surface of the bath so that it fails to melt. To counteract this agitation has to be provided e.g. either by the action of the induction heating current and/or by provision of mechanical agitation as with the impeller of vortex melting plant.

Furthermore excessive oxidation of the melt has to be prevented so that the whole process has to be carried out in a closed system with consequent problems of air locks or other sealing for the entry of the material and the tapping of the melt.

The heat requirements and heat losses are substantial if only because a large bath of metal has to be maintained in a molten state continuously prior to start up and throughout the operation.

The use of disposable aluminium cans, notably for beverages, is becoming more widespread particularly as brands are increasingly promoted nationwide and internationally e.g. on the European market, necessitating transport and distribution throughout wide areas. There is also increasing emphasis on the collection and recycling of can scrap both on economic and environmental grounds. Hitherto can scrap recovery plants have had to be large scale operations with substantial throughput for the reasons stated above so that optimum operation only becomes possible if the scrap is collected from a wide catchment area with consequent transport costs. Small scale plant, e.g. such as might be operated by a local scrap merchant, has not hitherto been practicable.

The same considerations apply to the recycling or recovery of similar scrap aluminum or other metal material, e.g. swarf and chippings or shredded or pulverised scrap from other sources.

The object of the invention is to provide metal melting or smelting apparatus, particularly for aluminium or other scrap recovery, which is particularly efficient and economical in use, can be provided in a wide range of sizes for large or small throughputs and the handling of small or large batches of scrap, which is of low initial cost and easy to install and maintain, and which is environmentally acceptable both in scale and in its manner of operation.

SUMMARY OF THE DISCLOSURE

According to one aspect of the invention there is provided a method of continuous melting of metallic or metal-containing material in the form of low density flakes, shreds, particles or other lightweight portions including the steps of providing structure defining a melting chamber, inducing a continuous upward flow of hot gases through the chamber at a controlled velocity and at a temperature in excess of the melting point of the material or constituents thereof, and feeding said portions into the chamber so that the portions are borne in said flow until melting occurs to transform the material of the portions or at least said constituents thereof into denser and more compact liquid droplets or globules dropping from the flow for collection from the chamber.

Preferably the flow of gases in the chamber has non-uniform velocity therein whereby un-melted portions having a range of sizes, weight or aerodynamic characteristics will reside in various respective tones of the chamber by being borne on said flow.

Conveniently the material is pre-heated before entry into the chamber.

According to a further aspect of the invention there is provided apparatus for continuous melting of metallic or metal-containing material in the form of low density flakes, shreds, particles or other lightweight portions including structure defining a melting chamber, means for inducing a continuous upward flow of hot gases through the chamber at a controlled velocity and at a temperature in excess of the melting point of the material or constituents thereof, and feed means for passing a stream of said portions into the chamber so that the portions are borne in said flow until melting occurs to transform the material of the portions or at least said constituents thereof into denser and more compact liquid droplets or globules dropping from the flow, and means for collecting accumulated melt from the chamber.

The melting chamber is preferably of non-uniform cross section whereby the velocity of the gas flow therein varies in respective tones thereof so that portions having different aerodynamic characteristics will reside in respective tones by being borne on the flow until melting takes place.

Conveniently the chamber is downwardly tapered so that the velocity of the upward flow reduces throughout its passage up the chamber.

It is also preferred that said means for inducing said flow includes a circulation duct interconnecting the top and bottom of the chamber so that at least a proportion of gases are recirculated therethrough in use.

Said apparatus may further include means for continuously pre-processing the material immediately prior to its passage to the feed means, typically said pre-processing may include a de-lacquering or de-coating furnace for removal of contaminants from the material, said process also pre-heating the material.

THE DRAWINGS

An example of the invention is now more particularly described with reference to the accompanying drawings in which.

DETAILED DESCRIPTION

The apparatus 6 is intended for the continuous melting of clean hot aluminium can scrap in low density lightweight shredded or flaked condition i.e. as produced by de-lacquering or de-coating apparatus 8 in known manner.

It is contemplated that the outfeed from such apparatus 8 will pass directly to the melting apparatus so that the whole recovery process is run as a continuous line with resulting economies in handling, space, and energy consumption.

Melting apparatus 6 comprises a vertical tubular shaft 10 formed of and/or lined with refractory or other heat resistant material to define a downwardly tapered melting chamber 12.

The height of chamber 12, in this example which is designed for a throughput of material at a rate of approximately 450 kg per hour, is around 2.2 meters, i.e. it will be noted that the apparatus is particularly compact. The size of the apparatus may be increased for higher capacity of throughput.

Figure 1:
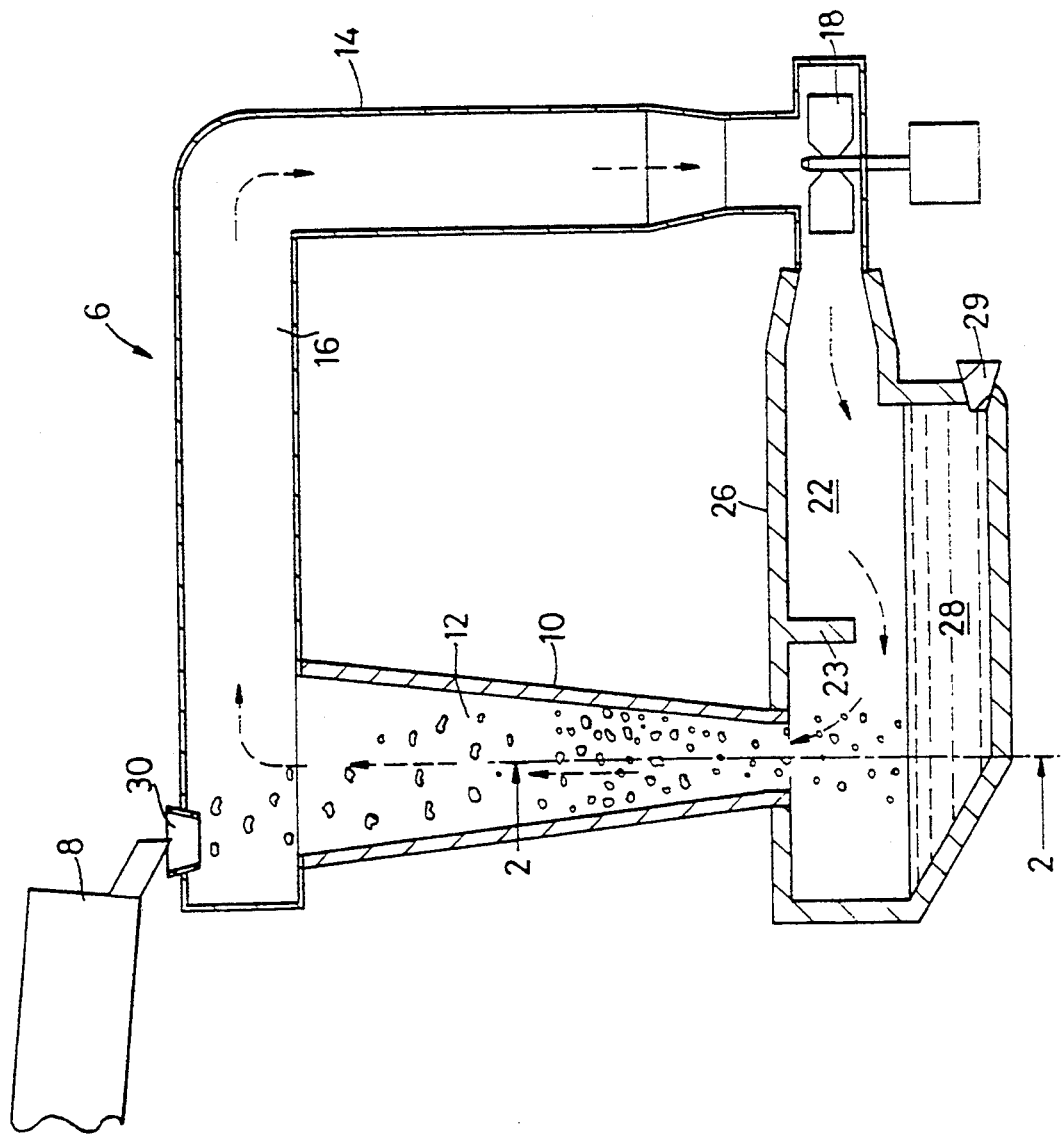
FIG. 1 is a diagrammatic sectional side elevation of melting apparatus.

A flow of heated gas indicated in FIG. 1 by broken arrows having low oxygen content is continuously induced upwardly through chamber 12 as part of a closed circuit by gas circulation means 14.

The latter includes a circulation duct 16 connected no enclose the top of shaft 10 and extending therefrom first horizontally and then downwardly to a powered circulation fan 18 controlled to induce and regulate the velocity of gas flow.

The bottom of shaft 10 opens into the top of an enclosed melt holding furnace 26, the lower part of which holds collected melt 28 dropping from shaft 10 as described hereafter. Melt 28 is tapped from a tap out block 29 as and when required e.g. for casting into ingots in conventional manner.

The upper part of furnace 26 forms a heating chamber 22 defining a lower horizontal path for the hot gases to reach the bottom of shaft 10, the output from fan 18 being fed into the end of chamber 22 remote from the shaft 10. A transverse arched bridge wall 23 midway along chamber 22 directs the gas flow downwards to act more directly on the surface of melt 28, before it ascends vertically up shaft 10 through melting chamber 12.

Figure 2:
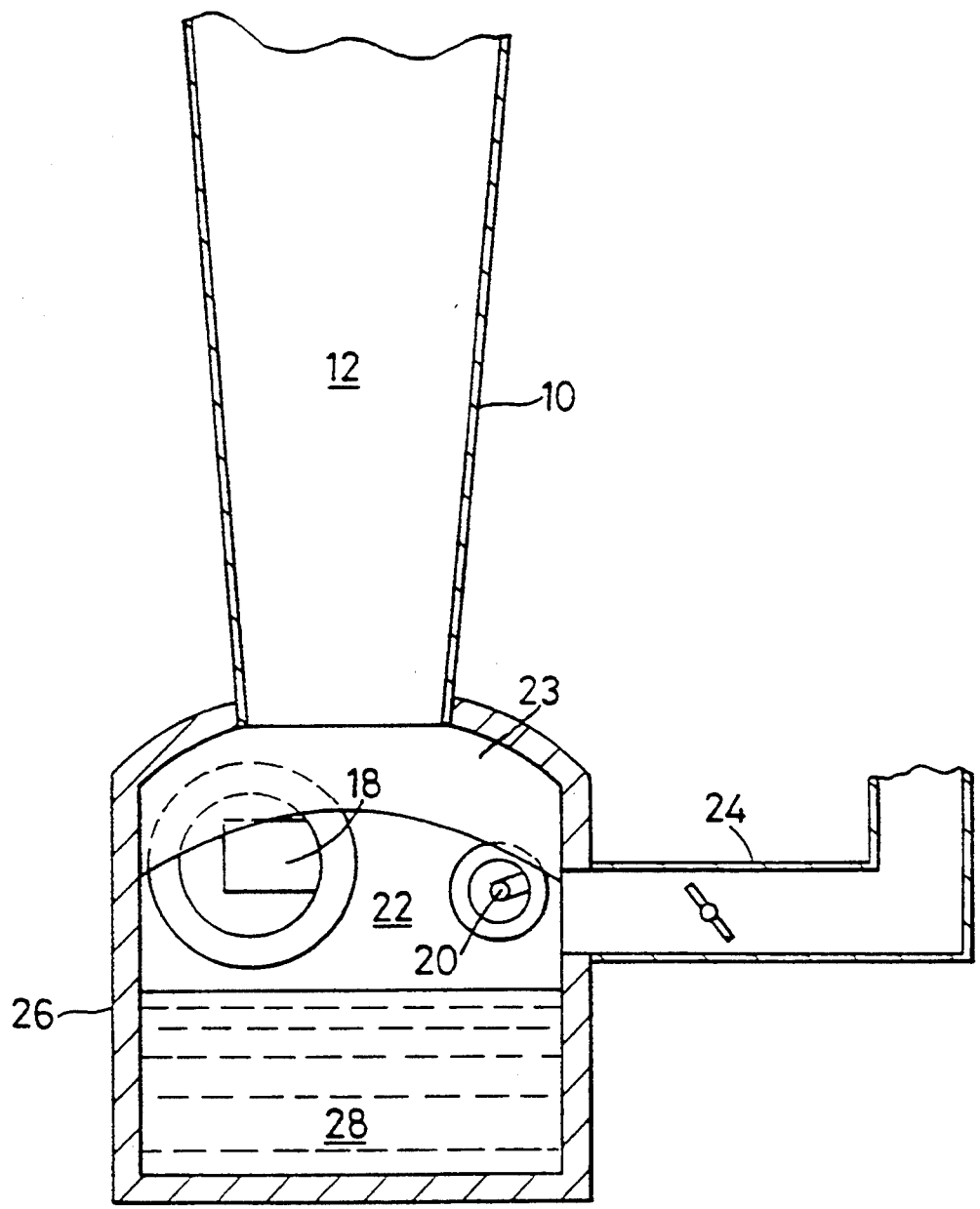
FIG. 2 is a diagrammatic sectional end view on line 2—2 of FIG. 1.

A gas or liquid fuelled burner 20 positioned in the end wall of holding furnace 26 alongside the outflow from fan 18 heats the circulating gases and also maintains the melt temperature in furnace 26. The temperature of the gases as they enter the bottom of chamber 12 is preferably around 800 deg.C. Surplus gases are bled from heating chamber 22 through a damper controlled side outlet flue 24 (FIG. 2).

The downwardly tapered frustrum shape of chamber 12 provides a decaying velocity of gas flow from the base to the top of shaft 10, the effective diameter of said chamber being around 360 mm at the base and around 740 mm at the top in this example.

As furnace 26 is only required for holding already melted material and does not play any substantial part in the actual melting process it can be of relatively small capacity, e.g., in this example, for retaining around 1,800 kgs of melt and will consume little extra heat if efficiently insulated.

In operation a continuous stream of the shredded or flaked portions of clean can scrap pass directly from the de-lacquering or de-coating apparatus 8 at a temperature of around 430° C. and at a feed rate of around 450 kgs per hour through a gas tight feeder 30 at the top of shaft 10.

The portions drop freely into the upward flow of hot gases and the velocity of the latter is sufficient to resist their downward fall so that they are borne by said flow an or around a generally constant level within chamber 12 in their unmelted condition. There will inevitably be some variation in size and weight of the portions so that they have different aerodynamic characteristics and the velocity gradient within chamber 12 will be designed to retain substantially all the portions at some level or vertical tone within the chamber.

As the portions are, in effect, floating separately within the flow of hot gases speedy and effective heat transfer from the latter takes place raising the temperature of each individual portion above its melting point.

As the portions melt they will generally each form an individual drop or globule of molten metal. These will be much more compact so that they have higher density relative to their surface area than the unmelted shredded or flaked portions, thus their resistance to the gas flow will be substantially reduced and they will drop downwardly through the contraflow either alone or by agglomeration with other drops or globules to collect in their melted state in holding furnace 26 as referred to above.

It is anticipated that the residence time of the portions in chamber 12 under the above conditions may be around 2.5 to 3 minutes, i.e. the melting process is quite speedy and a substantial continuous throughput rate can be maintained using the compact and economical apparatus described above.

As the gas circulation system is closed and the hot gases are acting directly and intimately on the already heated material the heat losses are small and the apparatus requires only low energy input.

It is appreciated that a few of the metal portions entering chamber 12 may be too large or too heavy to be aerodynamically sustained by the upwardly flowing gas stream SO that they drop through the chamber without melting. The apparatus is shaped to accommodate this by allowing such portions to drop directly into the collected melt 28. As very few such solid particles should reach the melt the temperature of the latter can be maintained at a sufficient level, without requiring excess heating, for full melting of these odd particles to be effected within the holding furnace 26 having in mind that they will have been further heated by their passage through chamber 18 even if their melting point has not been reached.

The invention is particularly suited to operate in conjunction with de-lacquering or de-coating apparatus of known construction in which the output therefrom is particularly clean and pure. This absence of contaminants ensures that no burning or oxidation takes place within the melting chamber 12, thus the gas flow velocity and temperature within the latter can be held at a optimum level for effective operation in relation to the throughput of material and the size of portions. The latter will generally be roughly flattened shreds or flakes approximately 16 sq. cms (2 sq. inches) in area.

It is contemplated that the melting apparatus of the invention may be provided in a wide range of capacities, thus plants with a throughput of up to 9,000 kgs per hour or more may be provided so that compact and economical complete metal recycling plant can be provided on a small or large scale.

While application to aluminium can scrap recovery has been particularly described the invention may have application to other metal processing or recovery operations, e.g. the recovery of ferrous or non-ferrous scrap such as swarf and chippings or crushed and shredded scrap, and/or the refining, casting, purification or other processing of metals or metalliferous materials. The pre-heating of the material portions entering the melting apparatus is desirable but may not be essential in all applications.

We claim:

1. A method of continuous melting of metallic or metal-containing material in the form of low density flakes, shreds, particles or other lightweight portions characterised by the steps of providing structure defining a melting chamber, inducing a continuous upward flow of hot gases through the chamber at a controlled velocity and at a temperature in excess of the melting point of the material or constituents thereof, and feeding said portions into the chamber so that the portions are borne in said flow until melting occurs to transform the material of the portions or at least said constituents thereof into denser and more compact liquid droplets or globules dropping from the flow for collection from the chamber.

2. A method as in claim 1 characterised in that the flow of gases in the chamber has non-uniform velocity therein whereby un-melted portions having a range of sizes, weight or aerodynamic characteristics will reside in various respective tones of the chamber by being borne on said flow.

3. A method as in claim 1 characterised in chat the material is pre-heated before entry into the chamber.

4. A method as in claim 1 characterised in that at least a proportion of the flow of hot gases is recirculated from the top to the bottom of the chamber.

5. A method as in claim 4 characterised in that circulation of the gases is enclosed, the gases having low oxygen content.

6. A method as in claim 4 characterised in that the recirculated hot gases are passed through a melt holding furnace for maintaining the temperature of molten material collected therein from the chamber.

7. Apparatus for the continuous melting of metallic material in the form of low density flakes, shreds, particles, or other lightweight portions, said apparatus comprising means defining a melting chamber, feed means for delivering said portions into said chamber, means for inducing in said chamber an upwardly flowing stream of gas at a temperature in excess of the melting temperature of said material and at a velocity to enable said portions to be borne in said stream until melting occurs and transforms the portions into denser and more compact liquid droplets which drop from said chamber, and means for collecting the liquid droplets.

8. Apparatus as in claim 7 wherein the melting chamber is of non-uniform cross section whereby the velocity of the gas stream varies in respective tones of said chamber so that those ones of said portions having different aerodynamic characteristics will reside in respective tones until melting thereof takes place.

9. Apparatus as in claim 8 characterized in that the chamber is downwardly tapered so that the velocity of the stream reduces throughout its passage up the chamber.

10. Apparatus as in claim 8 characterized in that said means for inducing said stream includes a circulation duct in communication with the chamber at its top and bottom so that at least a proportion of the stream of gases is recirculated.

11. Apparatus as in claim 7 including a melt holding furnace into which the liquid droplets drop from the melting chamber, and through which the stream of gases is fed to said chamber.

12. Apparatus as in claim 7 including means for pre-heating the material upstream of said chamber.

13. Apparatus as in claim 12 wherein said pre-heating means includes a de-lacquering or de-coating furnace for removal of contaminants from said material.

14. Apparatus as in claim 7 wherein said stream of gas has low oxygen content.

15. Apparatus as in claim 7 including heating means for heating said stream of gas and maintaining it at said temperature.

* * * * *

UNITED STATES PATENT AND TRADEMARK OFFICE
CERTIFICATE OF CORRECTION

PATENT NO. : 5,441,556
DATED : August 15, 1995
INVENTOR(S) : Keith C. Lewis, Ophneil H. Perry It is certified that error appears in the above-indentified patent and that said Letters Patent is hereby corrected as shown below:

Column 2, each of lines 34, 56 and 58, change "tones" to -- zones --.

Column 3, line 40, change "no" to -- to --.

Column 4, line 21, change "an" to -- at --; line 27, change "tone" to -- zone --; line 55, change "SO" to -- so --.

Column 5, line 48, change "tones" to -- zones --; line 50, change "chat" to -- that --.

Column 6, line 25, change "tones" to -- zones --; line 28, change "tones" to -- zones --.

Signed and Sealed this

Twenty-fourth Day of October, 1995

Attest:

BRUCE LEHMAN

*Attesting Officer*       *Commissioner of Patents and Trademarks*